US009636640B2

(12) United States Patent
Oh et al.

(10) Patent No.: US 9,636,640 B2
(45) Date of Patent: May 2, 2017

(54) SEPARATION MEMBRANE, METHOD FOR PREPARING THE SAME AND UNIT FOR PURIFICATION

(71) Applicant: LG ELECTRONICS INC., Seoul (KR)

(72) Inventors: Byungsoo Oh, Seoul (KR); Jeongil Kye, Seoul (KR); Minjoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 137 days.

(21) Appl. No.: 14/415,625

(22) PCT Filed: Sep. 27, 2013

(86) PCT No.: PCT/KR2013/008682
§ 371 (c)(1),
(2) Date: Jan. 19, 2015

(87) PCT Pub. No.: WO2014/051377
PCT Pub. Date: Apr. 3, 2014

(65) Prior Publication Data
US 2015/0165385 A1 Jun. 18, 2015

(30) Foreign Application Priority Data

Sep. 28, 2012 (KR) .................. 10-2012-0109506

(51) Int. Cl.
*B01F 3/04* (2006.01)
*B01D 71/00* (2006.01)
(Continued)

(52) U.S. Cl.
CPC ....... *B01D 71/024* (2013.01); *B01D 67/0002* (2013.01); *B01D 67/0088* (2013.01);
(Continued)

(58) Field of Classification Search
CPC .......... B01F 3/04; D21H 13/46; D21H 13/36; B01D 71/021; B01D 67/0002
(Continued)

(56) References Cited

U.S. PATENT DOCUMENTS 8,709,213 B2 * 4/2014 Compton ................. B32B 9/04
162/348
2008/0149561 A1 6/2008 Chu et al. ................ 210/500.38
(Continued)

FOREIGN PATENT DOCUMENTS

CN 101983758 A 3/2011
CN 102020271 A 4/2011
(Continued)

OTHER PUBLICATIONS

International Search Report and Written Opinion dated Jan. 24, 2014 issued in Application No. PCT/KR2013/008682.
(Continued)

*Primary Examiner* — Robert A Hopkins
(74) *Attorney, Agent, or Firm* — Ked & Associates, LLP

(57) ABSTRACT

A separation membrane for removing contaminants comprises: a hydrophobic membrane; and a graphene oxide layer formed to cover the hydrophobic membrane partially or wholly, wherein one surface of the hydrophobic membrane facing the graphene oxide layer has been hydrophilic-processed. The separation membrane is capable of enhancing removal efficiency on volatile contaminants, while maintaining a performance of the conventional separation membrane. The separation membrane is useful as a separation membrane for water treatment. Further, the separation membrane may be comprised in a membrane distillation apparatus, or may be utilized as a filter of a humidifier or a water purifier.

5 Claims, 3 Drawing Sheets

(51) Int. Cl.
- *B01D 71/02* (2006.01)
- *B01D 67/00* (2006.01)
- *B01D 69/12* (2006.01)
- *F24F 6/14* (2006.01)
- *B01D 71/38* (2006.01)
- *F24F 6/00* (2006.01)
- *F24F 3/14* (2006.01)

(52) U.S. Cl.
CPC ........... *B01D 69/12* (2013.01); *B01D 71/021* (2013.01); *B01D 71/38* (2013.01); *B01F 3/04* (2013.01); *F24F 6/00* (2013.01); *F24F 6/14* (2013.01); *B01D 2323/02* (2013.01); *B01D 2325/38* (2013.01); *F24F 2003/1435* (2013.01); *Y02B 30/545* (2013.01)

(58) Field of Classification Search
USPC .................................. 96/4, 11, 12; 261/100
See application file for complete search history.

(56) References Cited

U.S. PATENT DOCUMENTS

| | | | |
|---|---|---|---|
| 2011/0114897 A1 | 5/2011 | Aksay et al. | 252/511 |
| 2011/0123776 A1 | 5/2011 | Shin et al. | 428/172 |
| 2012/0107593 A1 | 5/2012 | Luo et al. | 428/220 |
| 2014/0069277 A1* | 3/2014 | Choi | B01D 53/228 96/13 |

FOREIGN PATENT DOCUMENTS

| | | |
|---|---|---|
| CN | 102180437 A | 9/2011 |
| CN | 102600734 A | 7/2012 |
| CN | 102614788 A | 8/2012 |
| KR | 10-2011-0031863 A | 3/2011 |

OTHER PUBLICATIONS

Chinese Office Action dated Sep. 6, 2015 issued in Application No. 201380036413.9 (with English translation).

* cited by examiner

SEPARATION MEMBRANE, METHOD FOR PREPARING THE SAME AND UNIT FOR PURIFICATION

CROSS-REFERENCE TO RELATED PATENT APPLICATIONS

This application is a U.S National Stage Application under 35 U.S.C. §371 of PCT Application No. PCT/KR2013/008682, filed Sep. 27, 2013, which claims priority to Korean Patent Application No. 10-2012-0109506, filed Sep. 28, 2012, whose entire disclosures are hereby incorporated by reference.

TECHNICAL FIELD

The present disclosure relates to a separation membrane for removing contaminants, a method for preparing the same and a unit for purification.

BACKGROUND ART

A membrane distillation, used in processes to prepare pure water or to remove salt from water, serves to remove contaminants. The membrane distillation is performed under a principle that a phase change occurs from the surface of a separation membrane of a hydrophobic polymer, vapor passes through the surface of the separation member through micro holes, and then the transmitted vapor is condensed to be separated.

The membrane distillation has the following advantages.

Firstly, as the membrane distillation is performed by a partial pressure difference between vapor disposed at one side of a separation membrane and vapor disposed at another side thereof, it can be executed at a lower pressure than an ultra filtration or a reverse osmosis. Secondly, the membrane distillation requires no additional pressure. Thirdly, the membrane distillation is effectively used to remove non-volatile ionic materials by separation. Fourthly, the membrane distillation can collect water with a predetermined rate, without being greatly influenced by concentration of contaminants contained in influent water.

The membrane distillation serves to remove contaminants contained in influent water using a hydrophobic polymer separation membrane. A surface tension of a solvent or a solute (hydrophilic material) contained in the influent water is larger than that of the separation membrane. Accordingly, liquid materials are separated from the surface of the separation membrane without passing through pores of the separation membrane. Contaminants undergo a phase change at inlets of the pores formed on the surface of the separation membrane. Then, the contaminants pass through the pores, and are condensed to be separated from the separation membrane. Therefore, such membrane distillation is disadvantageous in effectively removing volatile contaminants.

DISCLOSURE OF INVENTION

Technical Problem

Therefore, an object of the present invention is to provide a separation membrane for removing contaminants, capable of effectively removing volatile contaminants as well as non-volatile contaminants, while maintaining a performance of the conventional membrane distillation method, and a method for preparing the separation membrane in a simple manner.

Another object of the detailed description is to provide a unit for removing contaminants comprising the separation membrane for removing contaminants, the unit capable of effectively removing volatile contaminants as well as non-volatile contaminants, a membrane distillation apparatus, a humidifier, and a water purifier.

Solution to Problem

To achieve these and other advantages and in accordance with the purpose of the present invention, as embodied and broadly described herein, there is provided a separation membrane for removing contaminants, comprising a graphene oxide layer. The separation membrane for removing contaminants may comprise: a hydrophobic membrane; and a graphene oxide layer formed to cover the hydrophobic membrane partially or wholly, wherein one surface of the hydrophobic membrane facing the graphene oxide layer has been hydrophilic-processed.

The separation membrane for removing contaminants may further comprise a hydrophilic-processed layer between the hydrophobic membrane and the graphene oxide layer.

The hydrophobic membrane may comprise a hydrophobic polymer selected from a group consisting of polytetrafluoroethylene (PTFE), polyvinylidene fluoride (PVDF), polysulfone (PSF), polypropylene (PP), polyamide (PA), polyethylene (PE), polyimide and combinations thereof.

The hydrophilic-processed layer may comprise a hydrophilic polymer selected from a group consisting of polyvinyl alcohol (PVA), polyvinyl pyrrolidone (PVP), polyethylen glycol (PEG), cellulose acetate (CA) and combinations thereof.

The graphene oxide layer may comprise graphene oxide particles.

The graphene oxide layer may have a thickness of 100 nm~10 um.

The graphene oxide layer may have a thickness of 1 nm~2 um.

To achieve these and other advantages and in accordance with the purpose of this specification, as embodied and broadly described herein, there is also provided a method for preparing a separation membrane for removing contaminants, the method comprising: a hydrophilic-processing step of preparing a hydrophobic membrane having one hydrophilic-processed surface; and a graphene oxide layer forming step of forming a graphene oxide layer by applying a graphene oxide coating liquid containing graphene oxide particles onto the hydrophilic-processed hydrophilic surface of the hydrophobic membrane.

The hydrophilic-processing step may comprise a process of forming a hydrophilic-processed layer by applying a hydrophilic coating liquid containing a hydrophilic polymer, onto the hydrophobic membrane.

At least one of a process of forming a graphene oxide layer by applying a graphene oxide coating liquid onto the hydrophilic-processed hydrophobic membrane, and a process of forming a hydrophilic-processed layer by applying a hydrophilic coating liquid onto the hydrophobic membrane may be performed by a micro spray method selected from a group consisting of an air brush, a nebulizer, an atomizer, an electro-spray and combinations thereof.

At least one of the hydrophilic-processing step, and the graphene oxide layer forming step may be performed in a state where a temperature of the hydrophobic membrane is 20° C.~50° C.

The graphene oxide coating liquid may comprise a solvent and graphene oxide particles. The solvent may comprise one selected from a group consisting of water, ethylene glycol, dimethylformamide (DMF), methylpyrrolidone (NMP) tetrahydrofuran (THF) and combinations thereof.

A unit for removing contaminants according to another embodiment of the present invention may be provided to enhance removal efficiency on volatile contaminants. The unit for removing contaminants may comprise a separation membrane for removing contaminants which comprises a hydrophobic membrane and a graphene oxide layer.

The unit for removing contaminants may comprise: a separation membrane for removing contaminants which comprises a hydrophobic membrane and a graphene oxide layer; a supplying portion configured to supply influent water or vapor of the influent water, to a hydrophobic surface of the separation membrane for removing contaminants; and a cooling portion configured to condense and collect treated water having passed through the separation membrane for removing contaminants.

The unit for removing contaminants may further comprise a gap portion disposed between the separation membrane for removing contaminants and the cooling portion.

The cooling portion may comprise one selected from a group consisting of a condenser, cooling water and combinations thereof.

The gap portion may be maintained as a vacuum state. Alternatively, air or sweep gas may be injected into the gap portion.

A membrane distillation apparatus according to another embodiment of the present invention may comprise the separation membrane for removing contaminants.

A humidifier according to another embodiment of the present invention may comprise the separation membrane for removing contaminants.

A water purifier according to another embodiment of the present invention may comprise the separation membrane for removing contaminants.

The separation membrane for removing contaminants according to one embodiment of the present invention may comprise a graphene oxide layer containing a graphene oxide. The graphene oxide layer, applied to overcome disadvantages of a general separation membrane (hydrophobic membrane), can minimize volatile contaminants from passing through a separation membrane. Accordingly, the graphene oxide layer may be implemented as a separation membrane for water treatment.

The separation membrane for removing contaminants can enhance removal efficiency on volatile contaminants, by firstly removing non-volatile ionic materials by the hydrophobic membrane, and then by transmitting only vapor using the graphene oxide layer.

The separation membrane for removing contaminants may comprise a hydrophobic membrane, and a graphene oxide layer formed to cover the hydrophobic membrane partially or wholly.

The hydrophobic membrane may comprise a hydrophobic polymer selected from a group consisting of polytetrafluoroethylene (PTFE), polyvinylidene fluoride (PVDF), polysulfone (PSF), polypropylene (PP), polyamide (PA), polyethylene (PE), polyimide and combinations thereof.

One surface of the hydrophobic membrane facing the graphene oxide layer may be hydrophilic-processed, for an enhanced coupling force with the graphene oxide layer.

The separation membrane for removing contaminants may further comprise a hydrophilic-processed layer formed between the hydrophobic membrane and the graphene oxide layer, for an enhanced coupling force therebetween.

The hydrophilic-processed layer may comprise a hydrophilic polymer selected from a group consisting of polyvinyl alcohol (PVA), polyvinyl pyrrolidone (PVP), polyethylen glycol (PEG), cellulose acetate (CA) and combinations thereof.

The graphene oxide layer may comprise graphene oxide particles. The graphene oxide layer may serve to transmit only vapor without transmitting gas of a general organic volatile solvent. As the characteristics of the graphene oxide layer are applied to the conventional hydrophobic separation membrane, volatile organic materials as well as non-volatile ionic materials can be effectively removed. More specifically, non-volatile materials can be primarily removed by a hydrophobic membrane, and volatile materials can be secondarily removed by a graphene oxide layer, through a single separation membrane. Under such configuration, a disadvantage of the conventional hydrophobic separation membrane (i.e., low removal efficiency on volatile contaminants) can be significantly overcome, while an advantage thereof (i.e., high removal efficiency on non-volatile contaminants) can be maintained.

The graphene oxide layer may have a thickness of 10 um or less than, or a thickness of 100 nm~10 um. When the thickness of the graphene oxide layer is within such range, volatile contaminants can be effectively removed. Most preferably, the graphene oxide layer may have a thickness of 1 um~2 um. As the thickness of the graphene oxide layer is controlled to be within such range, a proper intensity of the graphene oxide layer can be maintained and a transmission rate with respect to water can be excellent. When the thickness of the graphene oxide layer is smaller, a transmission rate of the graphene oxide layer with respect to water is more enhanced. On the other hand, when the thickness of the graphene oxide layer is larger, a mechanical intensity of the graphene oxide layer is more enhanced. Considering such trade off characteristic, the graphene oxide layer can have an optimum performance when the thickness of the graphene oxide layer is 1~2 um.

The separation membrane for removing contaminants according to the present invention may comprise a graphene oxide layer. A non-oxidized graphene layer has a characteristic not to transmit any materials, whereas a graphene oxide layer has a characteristic to transmit only vapor without transmitting volatile contaminants. Such characteristic results from that a gap of several occurs in a graphene oxide layer due to a functional group containing oxygen and an epoxy group formed at a graphene oxide. Vapor passes through the gap of several in the graphene oxide layer by a capillary phenomenon, whereas volatile contaminants do not pass through the gap. Accordingly, the graphene oxide layer has a characteristic to transmit only vapor.

Under such configuration, the separation membrane for removing contaminants, which comprises a graphene oxide layer, can remarkably enhance removal efficiency on volatile contaminants, while maintaining a performance of the conventional separation membrane. If the separation membrane for removing contaminants is applied as a separation membrane for water treatment, efficiency of water treatment can be more enhanced.

A method for preparing a separation membrane for removing contaminants according to another embodiment of the present invention may comprise: a hydrophilic-processing step; and a graphene oxide layer forming step.

The hydrophilic-processing step may comprise a process of forming a hydrophilic-processed layer by applying a hydrophilic coating liquid containing a hydrophilic polymer, onto a hydrophobic membrane.

The hydrophobic membrane may comprise a hydrophobic polymer selected from a group consisting of polytetrafluoroethylene (PTFE), polyvinylidene fluoride (PVDF), polysulfone (PSF), polypropylene (PP), polyamide (PA), polyethylene (PE), polyimide and combinations thereof.

The hydrophilic-processing step may comprise a process of preparing a hydrophobic membrane having one hydrophilic-processed surface. Through the hydrophilic process, a coupling force between the hydrophobic membrane and the graphene oxide layer can be enhanced.

The hydrophilic-processing step may be performed by forming a hydrophilic-processed layer on one surface of the hydrophobic membrane in a simple manner, i.e., by applying a hydrophilic coating liquid onto the hydrophobic membrane.

The hydrophilic-processed layer may comprise a hydrophilic polymer selected from a group consisting of polyvinyl alcohol (PVA), polyvinyl pyrrolidone (PVP), polyethylen glycol (PEG), cellulose acetate (CA) and combinations thereof.

The graphene oxide layer forming step may comprise a process of applying a graphene oxide coating liquid containing graphene oxide particles onto the hydrophilic-processed surface of the hydrophobic membrane. In case of forming a graphene oxide layer using a graphene oxide coating liquid, a graphene oxide layer can be formed on the hydrophobic membrane through simple processes such as applying and drying a coating liquid.

The graphene oxide layer may have a thickness of 10 um or less than, a thickness of 100 nm~10 um, or a thickness of 1 nm~2 um.

Applying the graphene oxide coating liquid, a hydrophilic coating liquid, etc. may be performed by any method to form a coating layer on the hydrophobic membrane. More specifically, applying the graphene oxide coating liquid, a hydrophilic coating liquid, etc. may be performed by a micro spray method selected from a group consisting of an air brush, a nebulizer, an atomizer, an electro-spray and combinations thereof.

The method for preparing a separation membrane for removing contaminants may be performed by maintaining temperature of the hydrophobic membrane as 20° C.~50° C. on a heating plate. More specifically, the method may comprise: a primary drying process of fixing the hydrophobic membrane onto a heating plate, and applying a hydrophilic coating liquid onto the hydrophobic membrane, and then drying the hydrophilic coating liquid; and a process of applying the graphene oxide coating liquid onto the hydrophobic membrane. The method may further comprise a secondary drying process.

The graphene oxide coating liquid may comprise a first solvent and graphene oxide particles. As the first solvent, may be used any material capable of dispersing the graphene oxide particles by containing dissolved particles, and capable of preventing excessive transformation of the hydrophobic membrane or the hydrophilic-processed layer. Preferably, the first solvent may comprise one selected from a group consisting of water, ethylene glycol, dimethylformamide (DMF), methylpyrrolidone (NMP) tetrahydrofuran (THF) and combinations thereof. In this case, the degree of dispersion of the graphene oxide in the graphene oxide coating liquid can be enhanced.

The hydrophilic coating liquid may comprise a second solvent and a hydrophilic polymer. As the second solvent, may be used any material capable of dispersing the hydrophilic polymer, and capable of preventing excessive transformation of the hydrophobic membrane. Preferably, the second solvent may comprise one selected from a group consisting of water, ethylene glycol, dimethylformamide (DMF), methylpyrrolidone (NMP) tetrahydrofuran (THF) and combinations thereof.

The method for preparing a separation membrane for removing contaminants can serve to effectively remove volatile materials as well as non-volatile ionic materials in a simple manner, i.e., by forming a coating layer on the conventional hydrophobic separation membrane using a coating liquid. A separation membrane prepared by the method can be implemented as a separation membrane for water treatment.

A unit for removing contaminants according to another embodiment of the present invention may comprise a separation membrane for removing contaminants, the separation membrane comprising a hydrophobic membrane and a graphene oxide layer. The unit for removing contaminants, which comprises the graphene oxide layer, can enhance removal efficiency on volatile materials while maintaining a performance of the conventional separation membrane. Therefore, the unit for removing contaminants can effectively remove volatile materials as well as non-volatile materials.

The unit for removing contaminants may comprise a separation membrane for removing contaminants, a supplying portion, and a cooling portion.

The configuration, materials, characteristics and function of the separation membrane for removing contaminants are the same as those of the separation membrane for removing contaminants according to an embodiment of the present invention, and thus detailed explanations thereof will be omitted.

The supplying portion may be configured to supply influent water into a hydrophobic surface (first surface) of the separation membrane for removing contaminants. The influent water may be supplied in the form of a liquid or vapor. In a case where the influent water is supplied in the form of a liquid, the influent water may be supplied to flow with contacting the hydrophobic surface (first surface) of the separation membrane. On the other hand, in a case where the influent water is supplied in the form of vapor, the influent water may be supplied to flow with contacting the hydrophobic surface (first surface) of the separation membrane, by being vaporized by heat and so on.

The hydrophobic membrane of the separation membrane for removing contaminants may have a first surface exposed to outside, and a second surface facing the graphene oxide layer. Preferably, the supplying portion may be formed at the first surface (hydrophilic surface).

The cooling portion may be positioned to face the second surface of the hydrophobic membrane. The influent water may change into treated water after passing through the separation membrane for removing contaminants, and may be condensed to be collected by the cooling portion.

Any well-known means, capable of condensing and collecting vaporized treated water, may be used as the cooling portion. The cooling portion may comprise one of a condenser and cooling water, or both of them.

The unit for removing contaminants may comprise a gap portion formed between the cooling portion and the second surface of the separation membrane for removing contaminants. The gap portion can prevent direct movement of contaminants, etc. due to a direct contact between the cooling portion and the second surface of the separation membrane for removing contaminants. Further, the gap portion can reduce transmission of heat from the supplying portion to the cooling portion.

The gap portion may be supplied with air or sweep gas. Alternatively, the gap portion may be maintained as a vacuum state. In case of injecting air into the gap portion, the gap portion can reduce transmission of heat generated from the supplying portion, to the cooling portion. In this case, the gap portion can prevent introduction of contaminants into the separation membrane, the introduction occurring as water treated by the cooling portion comes in direct contact with the separation membrane for removing contaminants.

In a case where the gap portion is maintained as a vacuum state, a pressure difference between the supplying portion and the gap portion may be induced to increase a collect rate on the treated water.

In a case where sweep gas (i.e., cold inactive gas) is injected to the gap portion, the sweep gas may flow continuously in the gap portion, for an enhanced collect rate on the treated water.

The unit for removing contaminants according to the present invention can effectively remove volatile materials as well as non-volatile materials in a different manner from the conventional separation membrane for water treatment, by applying a separation membrane technique capable of effectively removing both non-volatile ionic materials and volatile materials.

In a membrane distillation apparatus according to another embodiment of the present invention, the separation membrane for removing contaminants according to an embodiment of the present invention may be comprised in the conventional membrane distillation apparatus. In this case, the separation membrane for removing contaminants can remove volatile materials as well as non-volatile materials without an additional process, while maintaining effects of the conventional separation membrane.

A humidifier or a water purifier according to another embodiment of the present invention may comprise the separation membrane for removing contaminants according to an embodiment of the present invention. The separation membrane for removing contaminants may be used as a filter of the humidifier, or a filter of the water purifier. The separation membrane for removing contaminants may be mounted to a vapor outlet of the humidifier, thereby removing contaminants such as non-volatile materials and volatile materials, and performing a disinfection function. Alternatively, the separation membrane for removing contaminants may be used as a filter of the water purifier.

Advantageous Effects of Invention

In the present invention, the separation membrane comprising a hydrophobic membrane and a graphene oxide layer may be used to effectively remove volatile contaminants as well as non-volatile contaminants, while maintaining a performance of the conventional separation membrane. Besides, the separation membrane for removing contaminants can be prepared by a simple coating method, and can be applied as a separation membrane for water treatment. Further, the separation membrane for removing contaminants can be used for removal of contaminants or for disinfection, in a device such as a membrane distillation apparatus, a humidifier and a water purifier.

BEST MODE FOR CARRYING OUT THE INVENTION

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

PREPARATION EXAMPLES

1. Preparation of Hydrophilic Coating Liquid and Graphene Oxide Coating Liquid 1 g of hydrophilic polymer, Polyvinyl alcohol (PVA, prepared by Aldrish Inc., 99+% hydrolyzed product, weight-average molecular weight of 89,000~98,000 g/mol) was mixed with 1,000 g of water serving as a solvent. Then, the mixture was heated at a temperature of 90° C. or more than, thereby preparing a hydrophilic coating liquid containing 0.1 wt. % hydrophilic polymer.

2 g of graphene oxide was mixed with 1,000 g (or mol) of water serving as a solvent, thereby preparing 0.2 wt. % graphene oxide coating liquid.

2. Preparation of Separation Membrane for Removing Contaminants

Figure 1:
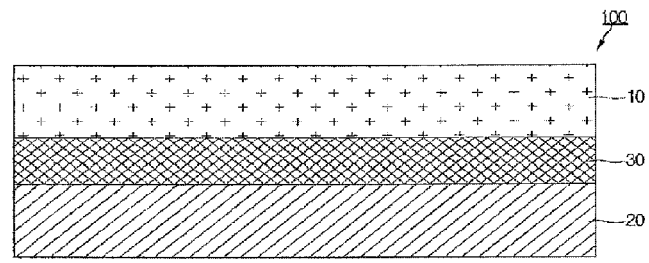
FIG. 1 is a sectional view of a separation membrane for removing contaminants according to an embodiment of the present invention.
Figure 2:
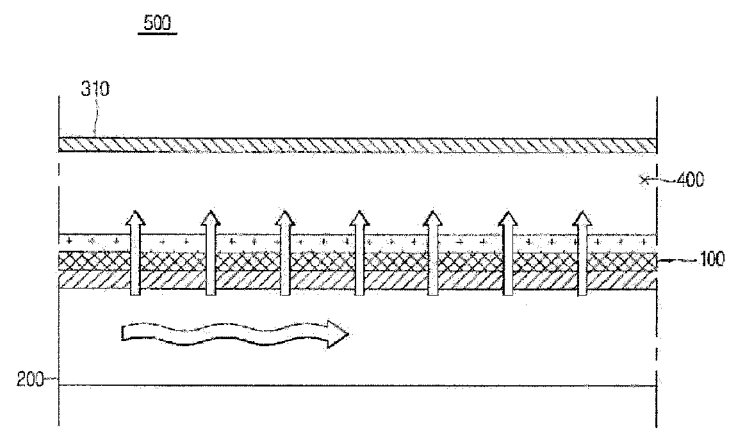
FIG. 2 is a conceptual view illustrating an example where a unit for removing contaminants according to an embodiment of the present invention comprises an air gap as a gap portion, and a condenser as a cooling portion.
Figure 3:
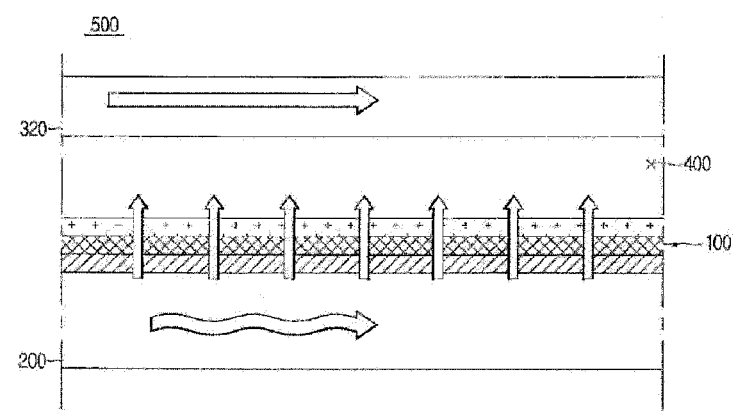
FIG. 3 is a conceptual view illustrating an example where a unit for removing contaminants according to an embodiment of the present invention comprises an air gap as a gap portion, and cooling water as a cooling portion.
Figure 4:
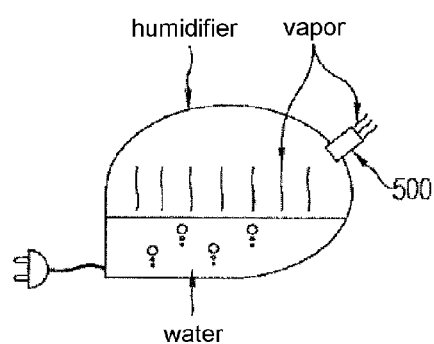
FIG. 4 is a conceptual view of a humidifier according to an embodiment of the present invention.

FIG. 1 is a sectional view of a separation membrane for removing contaminants 100. The separation membrane for removing contaminants 100 may include a graphene oxide layer 10, a hydrophilic-processed layer 30, and an hydrophobic membrane 20. FIG. 2 is a conceptual view illustrating an example where a unit for removing contaminants 500 comprises an air gap portion 400 and a condenser 310. The condenser 310 may be provided over the gap portion 400 and the separation membrane for removing contaminants 100 may be provided under the gap portion 400. A supplying portion 200 may be provided under the separation membrane for removing contaminants. FIG. 3 is a conceptual view illustrating an example where a unit for removing contaminants 500 comprises an air gap portion 400 and cooling water 320. The cooling water 320 may be provided over the gap portion 400. FIG. 4 is a conceptual view of a humidifier according to one embodiment including the unit for removing contaminants 500 as illustrated in FIGS. 2 and 3.

Polytetrafluoroethylene (PTFE, prepared by Milipore Inc., having a diameter of 47 mm), a hydrophobic membrane 20 was fixed onto a heating plate, and the temperature of heating plate was maintained as 50° C. 1-2 ml of hydrophilic coating liquid was applied onto the hydrophobic membrane 20 using an air brush, and then was dried for 10 minutes, thereby forming a hydrophilic-processed layer 30 on the hydrophobic membrane.

The graphene oxide coating liquid was applied onto the hydrophilic-processed layer 30 using an air brush, and then was dried for 30 minutes, thereby forming a graphene oxide layer 10. As a result, a separation membrane for removing contaminants 100 according to Example 1 was prepared.

EXPERIMENTAL EXAMPLES

1. Test for Removal of Volatile Materials by the Separation Membrane for Removing Contaminants according to Example 1

Figure 5A:
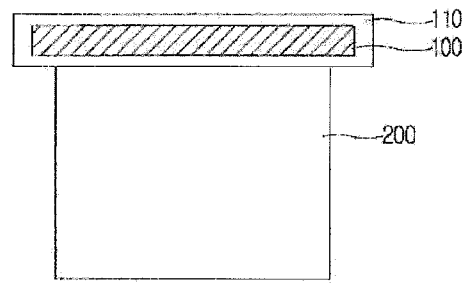
FIG. 5(a) is a frontal view of an evaporator used in experiments according to Example 1.
Figure 5B:
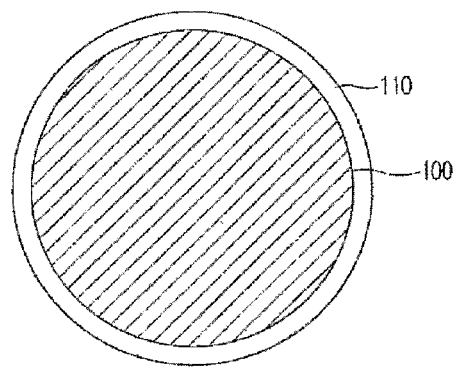
FIG. 5(b) is an upper view of the evaporator.

FIGS. 5(a) and 5(b) are conceptual views of an evaporator used in Experimental Examples according to the present invention. Referring to FIGS. 5(a) and 5(b), the separation membrane 100 according to Example 1 was arranged so that one surface 110 of a hydrophilic membrane exposed to outside can be positioned at a supplying portion 200 of a reactor. Then, ethanol, a volatile organic solvent, is injected into the supplying portion 200, thereby measuring an evaporation amount of the volatile organic solvent according to time. The results, on whether volatile contaminants have passed through the separation membrane for removing contaminants 100 according to Example 1, were shown in FIG. 6.

In Comparative Example 1, ethanol was injected into an evaporator having no separation membrane, in the same manner as in Example 1. The results thereof were shown in FIG. 6.

In Comparative Example 2, experiments were conducted in the same manner as in Example 1, except that polytetrafluoroethylene (PTFE, prepared by Milipore Inc.) serving as a hydrophobic membrane was used as a separation membrane. The results thereof were shown in FIG. 6.

In Comparative Example 3, experiments were conducted in the same manner as in Example 1, except that a separation membrane obtained by forming only a PVA coating layer on the hydrophobic membrane according to Comparative Example 2 was used. The results thereof were shown in FIG. 6.

Figure 6:
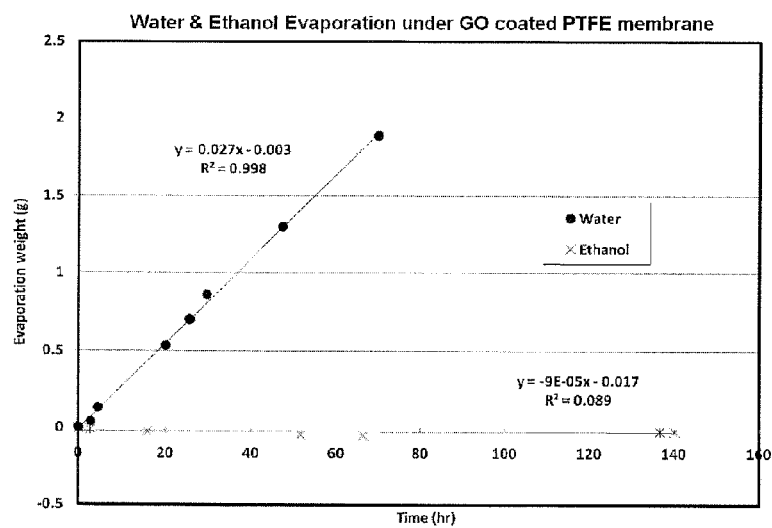
FIG. 6 is a graph illustrating results on efficiency of removing ethanol measured in Experimental Example 1 of the present invention.

FIG. 6 exhibits the results on Comparative Example 1 where no separation membrane has been installed, the results on Comparative Example 2 where only a hydrophobic membrane has been used, and the results on Comparative Example 3 where a PVA coating layer, a hydrophilic polymer has been formed on a hydrophilic membrane. Referring to FIG. 6, it could be verified that volatile contaminants were scarcely removed in Comparative Embodiments 2 and 3, because all of the ethanol (volatile material) was transmitted with the same ratio.

2. Test for Performance to Collect Water by the Separation Membrane for Removing Contaminants according to Example 1

A test for a performance to collect vapor was conducted in Example 1 and Comparative Embodiments 1~3 in the same manner as in Experimental Example 1, using the same reactor. However, water rather than ethanol (volatile material) was supplied to the supplying portion of the reactor. And the results of a collect rate (evaporation rate) on water were shown in FIG. 7.

Figure 7:
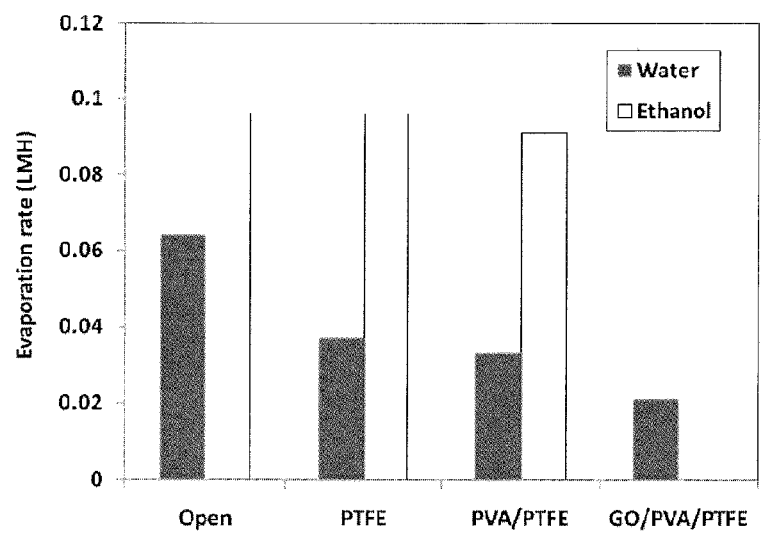
FIG. 7 is a graph illustrating results on evaporation rates on water and ethanol measured in Experimental Example 2 of the present invention.

Referring to FIG. 7, the separation membrane according to Example 1 exhibited an inferior collection rate on vapor per hour, than the separation membranes according to Comparative Embodiments 2 and 3. However, it could be verified that vapor was collected with a prescribed rate despite a formed graphene oxide layer.

The invention claimed is:

1. A method for preparing a separation membrane for removing contaminants, the method comprising:
    a hydrophilic-processing step of preparing a hydrophobic membrane having one hydrophilic-processed surface; and
    a graphene oxide layer forming step of forming a graphene oxide layer by applying a graphene oxide coating liquid containing graphene oxide particles onto the hydrophilic-processed surface of the hydrophobic membrane.

2. The method of claim 1, wherein the hydrophilic-processing step comprises a process of forming a hydrophilic-processed layer by applying a hydrophilic coating liquid containing a hydrophilic polymer, onto the hydrophobic membrane.

3. The method of claim 2, wherein at least one of a process of forming a graphene oxide layer by applying a graphene oxide coating liquid onto the hydrophilic-processed hydrophobic membrane, and a process of forming a hydrophilic-processed layer by applying a hydrophilic coating liquid onto the hydrophobic membrane is performed by a micro spray method selected from a group consisting of an air brush, a nebulizer, an atomizer, an electro-spray and combinations thereof.

4. The method of claim 1, wherein at least one of the hydrophilic-processing step, and the graphene oxide layer forming step is performed in a state where a temperature of the hydrophobic membrane is 20° C.~50° C.

5. The method of claim 1, wherein the graphene oxide coating liquid comprises a solvent and graphene oxide particles, and wherein the solvent comprises one selected from a group consisting of water, ethylene glycol, dimethylformamide (DMF), methylpyrrolidone (NMP) tetrahydrofuran (THF) and combinations thereof.

* * * * *